July 18, 1961
R. A. BOWKER
2,992,505
TROLLING DEVICE
Filed April 28, 1960
2 Sheets-Sheet 1
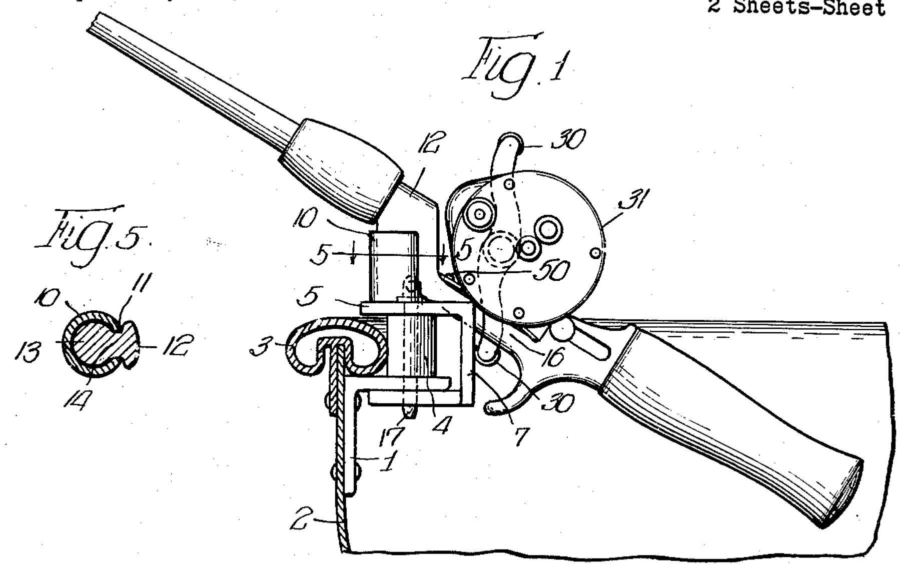
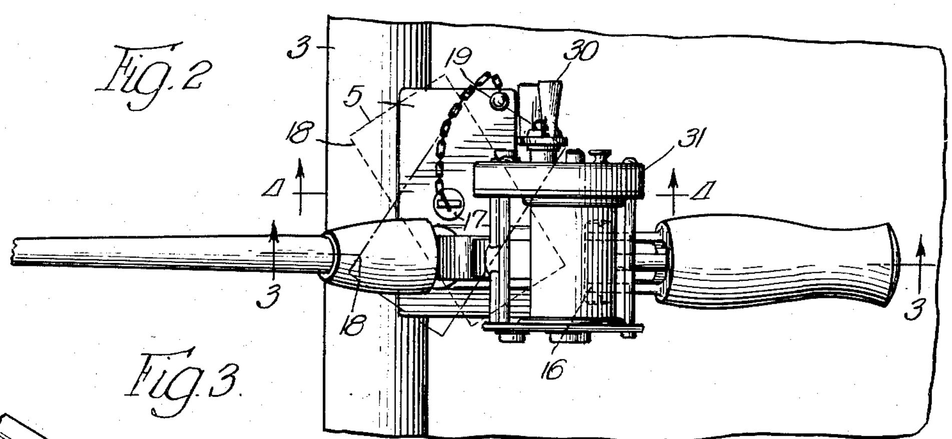
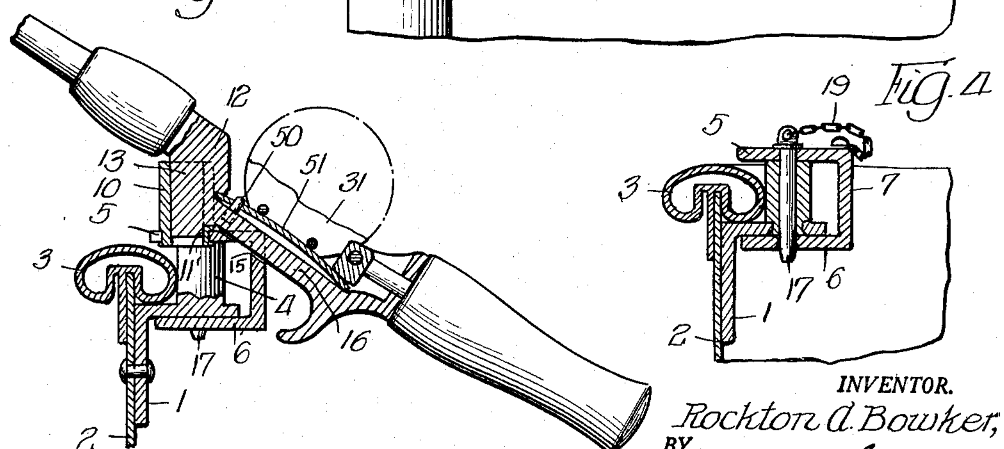
INVENTOR.
Rockton A. Bowker,
BY George H. Simmons
Atty.

July 18, 1961 R. A. BOWKER 2,992,505
TROLLING DEVICE
Filed April 28, 1960 2 Sheets-Sheet 2
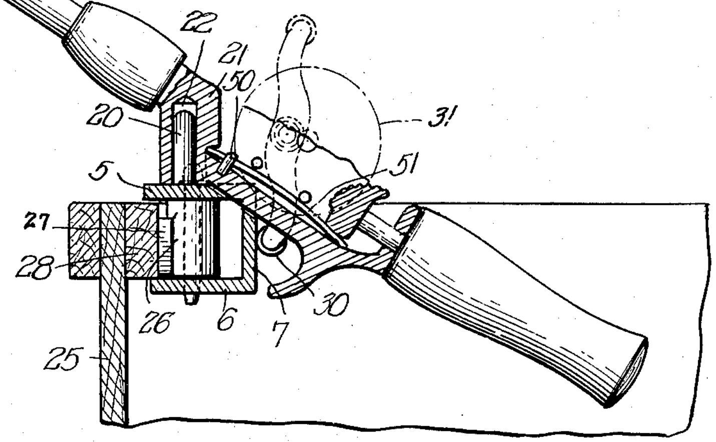
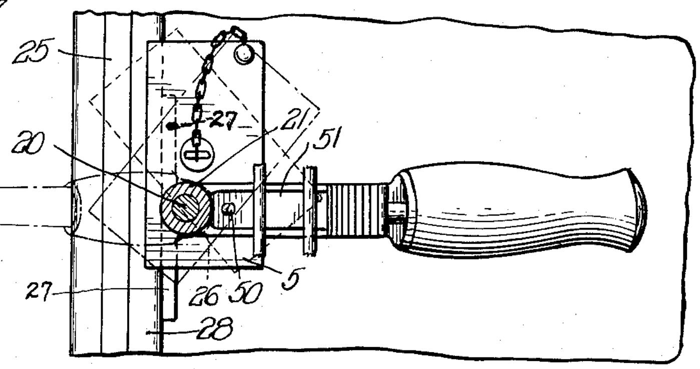
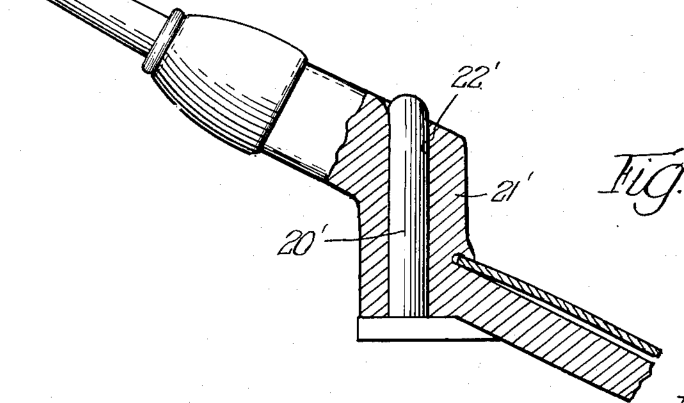
INVENTOR.
Rocklon A. Bowker,
BY George H. Simmons
Atty.

2,992,505
Patented July 18, 1961

2,992,505

TROLLING DEVICE

Rockton A. Bowker, 2817 E. 76th Place, Chicago 49, Ill.

Filed Apr. 28, 1960, Ser. No. 25,303
4 Claims. (Cl. 43—21.2)

This invention relates to a device for securing a fish rod upon a boat during trolling, and has for its principal object the provision of a new and improved device of this kind.

It is a main object of the invention to provide a device for mounting a modified handle of a fish rod upon either side or the end of a boat to securely hold the rod in proper position for trolling, which device permits the rod to be quickly and easily detached therefrom when a fish strikes.

Another object of the invention is to provide a rod holding device comprising two parts, one of which is permanently secured to the boat and the other part removably attached to the secured part in a convenient manner and without the use of tools.

Another object of the invention is to provide a device that includes a platelike portion against which the handle of a reel, that is mounted upon the handle of the rod, abuts to prevent rotation of the reel handle so long as the rod is registered with the device.

Another object of the invention is to provide a device that is of simple design permitting its manufacture at low cost without sacrificing quality.

Further objects of the invention not specifically mentioned here will be apparent from the detailed description and claims which follow, reference being had to the accompanying drawings in which a preferred embodiment of the invention is shown by way of example and in which:

FIG. 1 is an elevational view, partly in section, of the device mounted upon a metal boat;

FIG. 2 is a plan view of the device shown in FIG. 1;

FIG. 3 is a fragmentary sectional view of the device taken along the line 3—3 of FIG. 2, looking in the direction of the arrows;

FIG. 4 is a cross sectional view of the device taken along the line 4—4 of FIG. 2, looking in the direction of the arrows;

FIG. 5 is a cross sectional view through the socket and rod handle, taken along the line 5—5 of FIG. 1, looking in the direction of the arrows;

FIG. 6 is an elevational view, partly in section, of another form of the device mounted upon a wooden boat;

FIG. 7 is a plan view of the device shown in FIG. 6; and

FIG. 8 is a fragmentary view, partly in section, of another form of the device.

When trolling it is advantageous to have the rod securely fixed upon the boat in the correct trolling position by a device which permits the fisherman to quickly and easily detach the rod from the boat when a fish strikes or when the line is snagged. The device of the present invention fulfills these requirements.

In its preferred form, the device of the present invention consists of a bracket permanently mounted or clamped upon the boat and carrying a boss that extends slightly above the inside top edge of the boat. The device also consists of a mounting base pivotally secured on the boss of the bracket for correct automatic trolling position, which base carries means that engage with companion means on the handle of the rod to securely hold the rod handle on the boat. The mounting base is supported upon the bracket by a pin which can be removed without the use of tools to permit detaching the mounting base from the bracket. The mounting base contains a vertically disposed planar surface against which the adjustable slip clutch handle of a reel, mounted upon the rod, abuts when the rod is secured in the device thereby to prevent rotation of the reel handle. This arrangement permits strain upon the line to pay out line and thereby prevent undue stress on the line and rod.

When a fish strikes, it is only necessary for the fisherman to raise the rod vertically to detach it from the mounting base and to free the reel handle so that it may be operated as required in landing the fish.

The invention will be best understood by reference to the accompanying drawings where in FIG. 1 it will be seen that the device consists of an angle bracket 1 fixed upon the side wall 2 of a boat adjacent the cap member 3 thereof and carrying a boss 4 that extends slightly above the top edge of the cap member. The mounting base is generally C shaped and consists of an upper horizontal plate 5 that engages the upper end of the boss 4, a lower horizontal plate 6 that engages the lower end of the boss 4 and the horizontal portion of the bracket 1, and a vertical plate 7 that connects together the horizontal plates of the base.

Projecting upwardly from the upper portion 5 is a socket 10 which, in the example shown, is cylindrical in shape and contains a slot 11 extending from its upper end into juxtaposition to its lower end.

The handle of the rod is modified in the portion 12 disposed forwardly of the reel mounting and contains a stud 13 dimensioned to fit within the socket 10. Interposed between the stud 13 and remainder of the portion 12 of the handle is a narrow portion 14 dimensioned to fit within the slot 11 in the socket 10.

The slot 11 terminates a short distance above the upper surface of plate 5 as indicated at 11′ in FIG. 3. The stud 13 on the rod handle projects below the bottom of the narrowed portion 14 and engages the wall of the socket at 11′. Through this arrangement the rod handle is held against rotation around a horizontal axis by the engagement of the stud 13 with the walls of socket 10 and also with the portion 11′ of those walls.

It will be noted, particularly in FIG. 3, that the mounting base contains an inclined groove 15 into which the portion 16 of the rod handle beneath the reel snugly fits. Thus rotation of the rod around the axis of the stud 13 is prevented by the necklike portion 14 engaging the sides of the slot 11 and by the engagement of the portion 16 of the rod handle with the edges of the groove 15.

The mounting base contains perforations in its upper plate 5 and lower plate 6, and the boss 4 contains a similar perforation through which a pin 17 is extended to pivotally mount the base upon the bracket. The upper plate 5 and vertical plate 7 of the base are rectangular in shape and the pivotal connection of the base with the bracket permits rotation of the base far enough to bring the ends of the portion 7 into engagement with the cap member 3, the limits portion of this rotation being indicated by the dotted lines 18 in FIG. 2. The pin 17 is preferably secured to the base in convenient manner such as by a chain 19 to prevent it from being separated therefrom.

Through this rotation of the device around the axis of pin 17, the rod moves into correct trolling position and projects from the boat at an angle of approximately 50° to the side of the boat. The distal end of the rod is positioned outwardly from the boat far enough to keep the line out of the path of the oars when oars are used, and far enough above the surface of the water to prevent it from being immersed therein. Since the mounting device can rotate in either direction around the axis of pin 17, the correct trolling position is achieved on either side of the boat.

Thus it will be seen that the embodiment of the invention shown in FIGS. 1 to 5 employs a socket on the base of the device and a stud on the rod handle. In FIG. 6, I have shown a modified form of device in which the base carries a stud 20 and the portion 21 of the rod handle forwardly of the reel is equipped with a socket 22 into which the stud projects. As shown in FIG. 6, the socket 22 does not extend completely through the portion 21 of the rod handle. In FIG. 8, I have shown a modified form in which the stud 20' is somewhat longer and the socket 22' extends completely through the portion 21' of the rod handle.

In FIG. 6, I have shown the device attached to the side wall 25 of a wooden boat, the bracket in this embodiment having a boss 26 from which are projected laterally extending ears 27 that are secured to an inner trim member 28 at the top of the side 25 of the boat in convenient manner such as by screws.

In both embodiments of the invention the handle 30 of the adjustable slip clutch reel 31 abuts against the vertical wall portion 7 of the mounting base thereby to prevent rotation of the reel handle so long as the rod is registered with the device. When a fish strikes, it is only necessary for the fisherman to grab the handle of the rod, elevate the handle and the rod vertically thereby to disengage the rod from the boat and free the reel handle for necessary manipulation in the landing of the fish.

It will be observed that upon snagging of bait or hooks, and hooking of a fish, enough force is applied to the line to actuate the adjustable slip clutch of the reel handle to pay out line as required. The fisherman's attention to the pay out is called by the clicking of the reel. This action is necessary to prevent breakage of the device or rod and reel. In other words, there is at all times a necessary controlled give to the line.

It will be observed that in both embodiments of the invention the rod is extended upwardly from the boat so that the distal end of the rod is far enough above the water to prevent its being submerged in the water even though the rod be bent by a fish on the line.

There are available upon the open market a number of different rod handles that can be modified to permit their use with the device of the present invention. Throughout the drawings I have shown the rod handle equipped with a pin 50 that extends through the mounting plate 51 of the reel to aid in securing the reel on the rod handle against accidental displacement therefrom.

While the mounting base of the present invention is shown and described as attached to a bracket in a boat to hold a rod in proper position for trolling, it will be apparent to one skilled in the art that this base may be mounted upon a bracket that is attached to a pier or to a bracket fixed upon a stake projecting into the ground, to hold a rod for still fishing. Such additional uses of the mounting base are contemplated.

While I have chosen to show my invention by illustrating and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What I claim is:

1. A device for securely holding a fish rod and reel upon a boat in proper position for trolling and for permitting the rod to be detached readily, comprising: a bracket mounted upon the boat and containing a perforated boss; a mounting base that contains an upper horizontal planar plate that engages the upper surface of said boss, a lower horizontal planar plate that engages the under side of the boss, and a vertical planar plate connecting together said horizontal plates; said horizontal plates containing perforations aligned with the perforation in the boss, a pin projecting through said perforations to pivotally mount the base upon the bracket for limited rotation around the axis of the pin; and interengaged means upon the base and handle of the rod for holding the rod in fixed position relative to the base with the handle of the reel on the rod engaging the vertical portion of the base to prevent rotation of the reel handle so long as the rod is mounted upon the base.

2. A device as specified in claim 1, in which the interengaged means on the base and rod comprises: a socket that projects upwardly from the upper horizontal plate of the base and has a vertical slot in its side that is adjacent the vertical portion of the base, which slot terminates a short distance above said upper horizontal plate; and a stud joined to the rod handle by a reduced thickness portion and extending slightly below that portion of the handle, said stud extending into said socket and engaging the portion thereof below the slot therein to hold the rod against rotation around a horizontal axis and said reduced portion engaging the edges of the slot to hold the rod against rotation with respect to the base around the axis of the socket.

3. A device as specified in claim 2, in which the base contains an inclined groove located at the junction of the vertical and upper horizontal plates of the base and aligned with the slot in the socket into which groove a portion of the handle of the rod extends to aid in preventing rotation of the rod around the axis of the socket.

4. A device as specified in claim 1, in which the interengaged means comprises a stud projecting upwardly from the upper horizontal plate of the base and a socket in the handle of the rod into which the stud projects and in which the base contains an inclined groove located at the junction of the vertical and upper horizontal plates and aligned with the stud, into which groove the handle of the rod projects to prevent rotation of the rod around the axis of the stud.

References Cited in the file of this patent

UNITED STATES PATENTS

| | | |
|---|---|---|
| 981,356 | Aydelott | Jan. 10, 1911 |
| 2,459,549 | Smith | Jan. 18, 1949 |
| 2,513,475 | Grevich | July 4, 1950 |
| 2,542,253 | King | Feb. 20, 1951 |
| 2,581,671 | Katter | Jan. 8, 1952 |
| 2,596,247 | Kacsor | May 13, 1952 |
| 2,707,089 | Jackson | Apr. 26, 1955 |
| 2,851,813 | Gugliotta | Sept. 16, 1958 |
| 2,899,769 | Niles | Aug. 18, 1959 |

FOREIGN PATENTS

| | | |
|---|---|---|
| 23,865 | Finland | Mar. 29, 1950 |